Dec. 10, 1935.  F. C. LAMB  2,023,599
SAFETY BRAKE FOR MOTOR VEHICLES
Filed Sept. 23, 1931    3 Sheets-Sheet 1
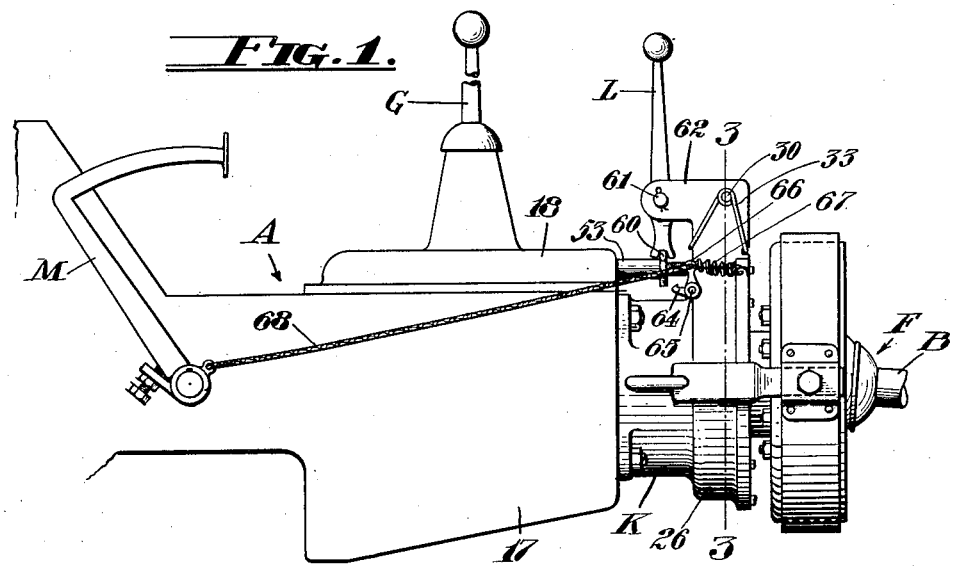
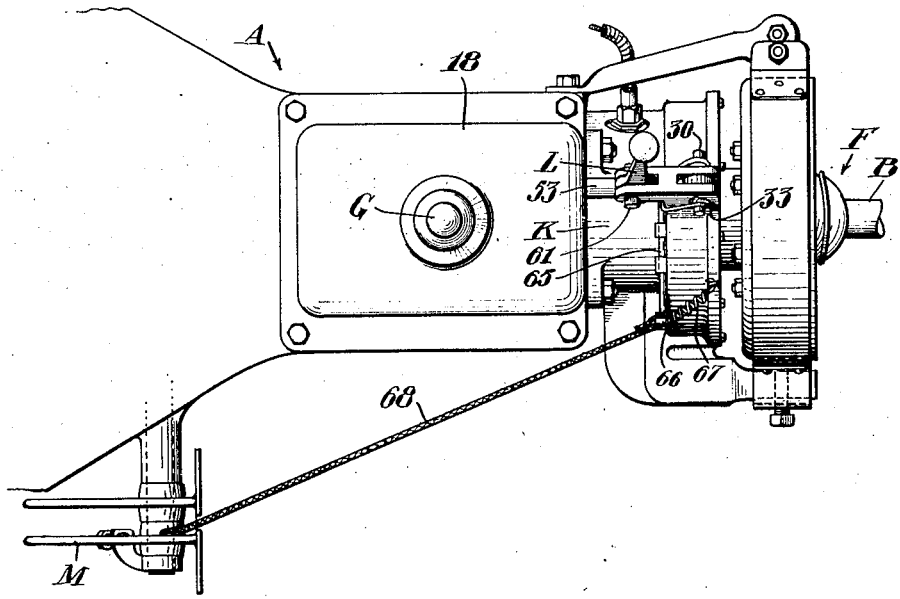
Inventor:
Frank C. Lamb.
By
R. S. Berry
Atty.

Dec. 10, 1935.   F. C. LAMB   2,023,599
SAFETY BRAKE FOR MOTOR VEHICLES
Filed Sept. 23, 1931   3 Sheets-Sheet 2
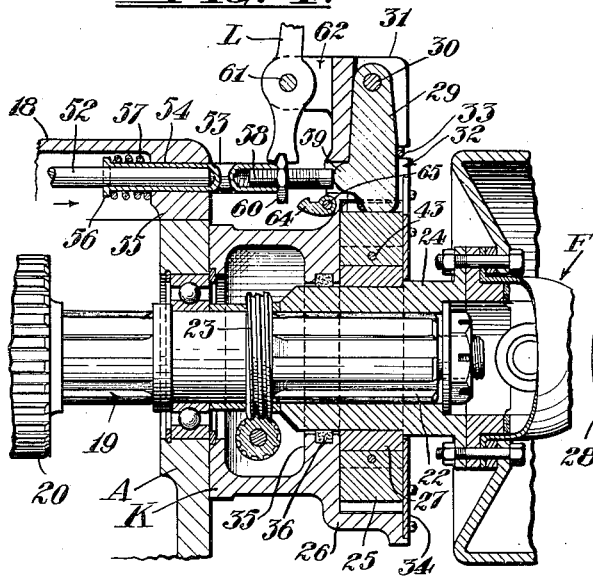
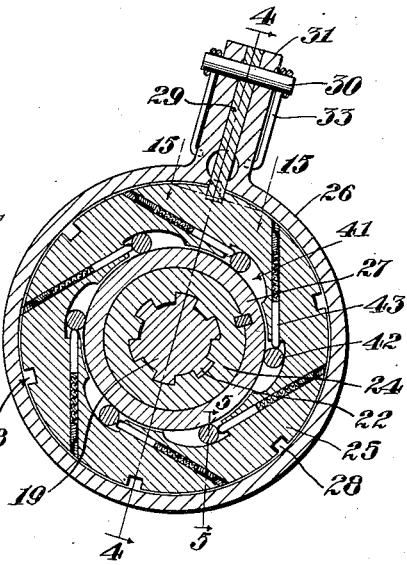
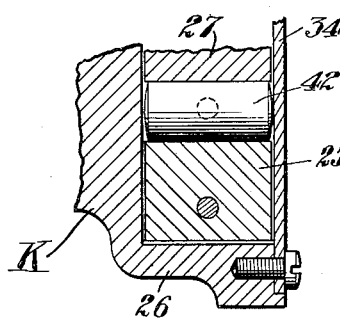
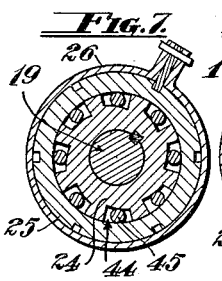
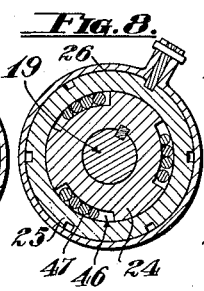
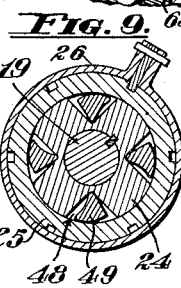
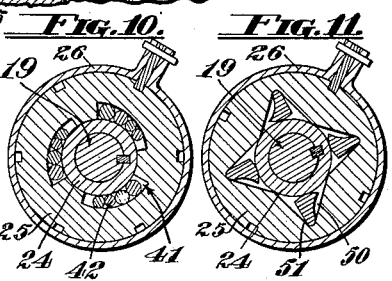
Inventor:
Frank C. Lamb.
By
Att'y.

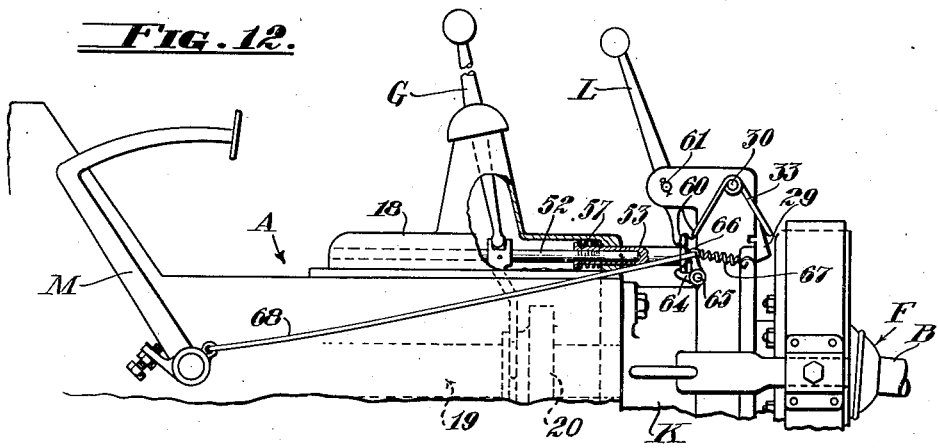
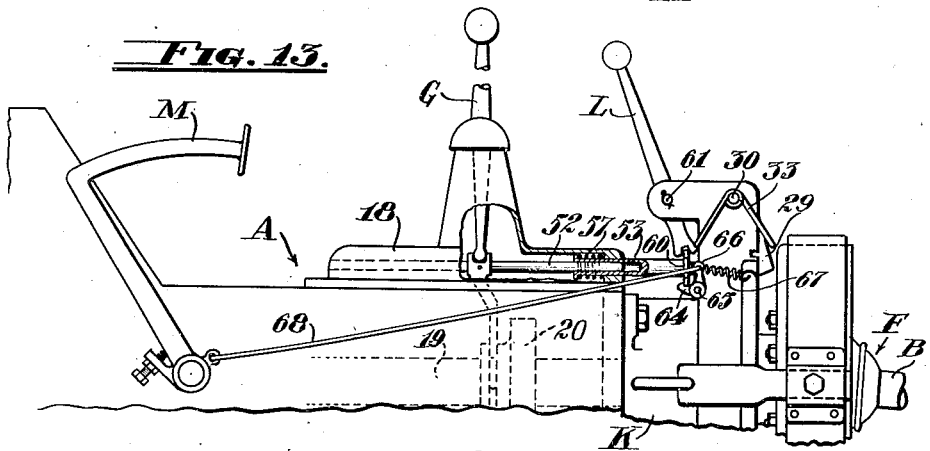
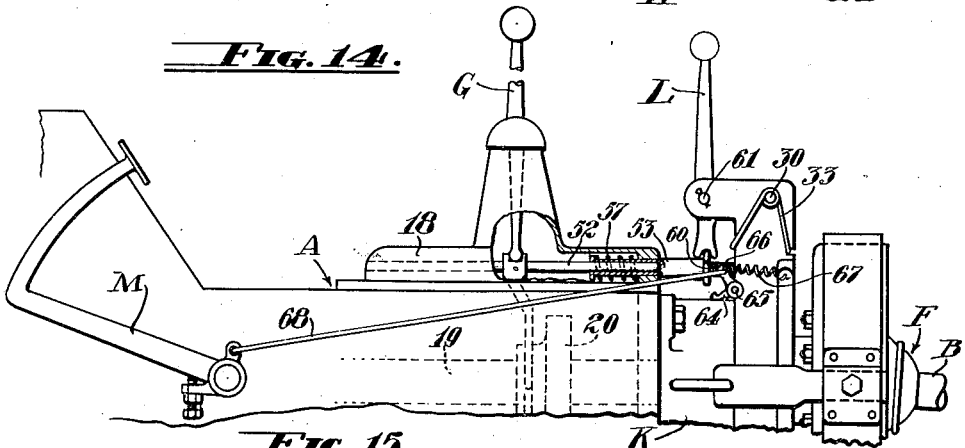
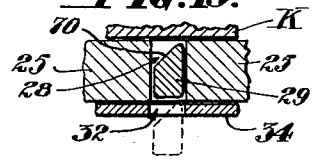
Inventor:
Frank C. Lamb.
By R. S. Birry
Atty.

Patented Dec. 10, 1935

2,023,599

UNITED STATES PATENT OFFICE 2,023,599

SAFETY BRAKE FOR MOTOR VEHICLES

Frank C. Lamb, Los Angeles, Calif.

Application September 28, 1931, Serial No. 565,444

6 Claims. (Cl. 192—4)

This invention relates to a safety brake for motor vehicles, and more particularly pertains to a brake for automatically inhibiting undesired or accidental reverse movement of a motor vehicle, and especially to improvements in brakes of the character set forth in my copending applications for United States Letters Patent Serial Number 717,276, filed June 2, 1924; and Serial Number 445,967, filed April 21, 1930; and in Letters Patent Number 1,822,491, issued September 8, 1931.

An object of the invention is to provide a mechanism adapted to be associated and combined with the transmission mechanism, the propeller shaft and the manually operated transmission control mechanism of a power propelled vehicle and which is adapted and operable to prevent unwanted retrograde movement of the vehicle by inhibiting undesired reverse movement of the vehicle propeller shaft.

Another object is to provide a reverse arresting mechanism for motor vehicles which will not interfere with propulsion of a vehicle in a forward position, but which will effectively prevent rearward movement thereof at all times except when the reverse mechanism of the vehicle is in operation or when the reverse arresting mechanism is manually placed out of operative position.

Another object is to provide a reverse arresting mechanism for motor vehicles which is adapted to be automatically operated to permit reverse movement of the vehicle when the reversing mechanism of the latter is placed in operation, and also be manually disposed in a neutral position to permit reverse movement of the vehicle other than through its propelling mechanism.

A further object is to provide a means whereby the reverse arresting mechanism will, after having been manually placed out of operative position, be automatically restored to its operative position on setting the vehicle driving mechanism in operation so as to insure against the reverse arresting mechanism being inadvertently maintained in its neutral condition during propulsion of the vehicle.

Another object is to provide a brake for preventing rearward movement of a motor driven vehicle which is adapted to be associated with the transmission mechanism of the vehicle in such manner as to normally prevent retrograde rotation of the vehicle drive shaft under the urge of reverse rotative efforts applied thereto through the vehicle wheels when the vehicle transmission mechanism is normally in neutral, but which is operable by manipulation of the transmission control lever on positioning the latter to dispose the transmission mechanism in reverse to permit retrograde rotation of the drive shaft and which may also be rendered neutral at will by actuation of an independent manual control thereof and so remain while the transmission mechanism is in neutral to permit reverse rotation of the drive shaft through the vehicle wheels, and whereby the brake mechanism will be restored into operative relation with the vehicle drive shaft on actuating the vehicle clutch control lever in throwing out the clutch preparatory to effecting shifting of the transmission gears.

Another object is to provide a reverse arresting brake for motor vehicles which on being applied to inhibit reverse movement of the vehicle, will permit immediate advance movement of the vehicle and without necessitating or permitting any reverse movement of the vehicle before effecting advance thereof.

A further object is to provide a reverse arresting brake of the above character which may be readily associated with the ordinary transmission mechanism of motor vehicles now generally in use and applied to the transmission gear case for coaction with the portion of the vehicle drive shaft projecting from the gear case.

With the foregoing objects in view, together with such other objects and advantages as may subsequently appear, the invention resides in the parts and in the combination, construction and arrangement of parts, or their equivalents, described in the following specification, set forth in the appended claims and illustrated by way of example in the accompanying drawings, in which:

Figure 1 is a view in side elevation of the vehicle reverse arresting mechanism, showing it as applied;

Figure 2 is a plan view of the structure shown in Figure 1;

Figure 3 is a detail in cross section as seen on the line 3—3 of Figure 1, depicting the anti-reverse brake;

Figure 4 is a view in vertical section with parts in elevation of the reverse arresting mechanism as seen on the line 4—4 of Figure 3;

Figure 5 is a detail in section and elevation as seen on the line 5—5 of Figure 3;

Figure 6 is a fragmentary perspective view of the portion of the mechanism for placing the reverse arresting mechanism in and out of operative position;

Figures 7, 8, 9, 10 and 11 are views in section illustrating a series of modified forms of the anti-reverse brakes adapted to be employed in lieu of the construction shown in Figure 3;

Figure 12 is a diagram illustrating the manner of throwing the reverse arresting mechanism into neutral on operation of the transmission control lever on placing the transmission gearing in reverse;

Figure 13 is a diagram illustrating the manner of manually placing the reverse arresting mechanism in neutral at will;

Figure 14 is a diagram illustrating the manner of effecting restoration of the reverse arresting mechanism to its operative position after having disposed same in a neutral condition;

Figure 15 is a detail in section taken on line 15—15 of Figure 3.

Referring to the drawings more specifically, A indicates generally the transmission gear case of a motor vehicle which embodies a body portion 17 and a cover portion 18, and B designates a propeller shaft through which motion is transmitted through the usual gearing arranged in the gear case A from a source of power on the vehicle to the driving or traction wheels of the latter as is common in motor vehicle construction; the propeller shaft B leading into a differential gear case where it is geared in the usual manner to the vehicle rear axles affixed to the vehicle wheels in the well-known manner. The propeller shaft B is connected through the usual universal joint in a housing F with a short shaft 19 projecting into the gear case A and forming part of the propeller shaft B, which shaft 19 has the usual transmission gear wheels splined thereon interiorly of the gear case including a gear wheel 20 adapted to be shifted longitudinally of the shaft 19 through the medium of a manually operable gear shift lever G to effect change speed and reverse rotation of the shaft 19 and propeller shaft B from a power-propelled shaft in the well-known manner. The outer portion of the shaft 19 is formed with the usual longitudinally extending ribs 22 and carries a speedometer operating worm wheel 23 enclosed in a housing K carried on the gear case A.

In carrying out the present invention, a sleeve 24 is mounted on the shaft 19, adjacent the worm wheel 23, and is affixed to the shaft through the medium of the ribs 22, and loosely mounted on the sleeve is a ring 25 constituting a movable brake member and being part of the reverse arresting brake. The ring 25 is encased within the outer portion of the housing K; the latter being formed with an end flange 26 which encircles the periphery of the ring 25 in slightly spaced relation thereto or in sliding contact therewith; the flange 26 constituting a fixed brake member. A liner 27 is interposed between the ring 25 and the sleeve 24 and is keyed to the latter.

The brake ring 25 is designed to be normally held stationary within the housing K when in brake operating condition and to be freed relative to the housing K when in its non-braking condition. For this purpose, as here shown, the outer periphery of the ring 25 is formed with a series of depressions or channels 28 any one of which is adapted to be engaged by a detent 29 carried by the housing K; the detent depending from a pivot pin 30 carried on a slotted lug 31 formed on and projecting upwardly from the upper portion of a slotted housing. The lower end of the detent extends through a slot 32 formed in the flange 26 of the housing and is normally and yieldably maintained in its ring engaging position by a spring 33 bearing thereon.

A demountable face plate 34 carried on the flange 26 of the housing K extends over the outer face of the ring 25 from the sleeve 24.

The housing K is formed with an inwardly projecting wall 35 extending into close proximity with the outer periphery of the sleeve 24 and interposed between the inner margin of this wall and the sleeve 24 is a packing ring 36 which serves to prevent the passage of grease or lubricant in the chamber enclosing the worm wheel 23 from passing into the space in the housing K enclosing the ring 25 so as to prevent lubrication of the latter.

The inner periphery of the brake ring 25 is formed with a plurality of recesses 41 which open to the ring 27 in each of which recesses is mounted one or more dogs 42 constituting brake engaging elements and adapted on rotation of the shaft 19 in one direction to ride freely over the outer periphery of the liner 27 on the sleeve 24, but on slight turning of the shaft 19 in a reverse direction will act to effect wedge engagement between the brake ring 25 and the liner 27 and thereby inhibit reverse rotation of the shaft 19 and its connections. The shaft 19 is thus free to rotate in only one direction and is adapted to automatically lock against rotation in the other direction.

In the form of the brake element shown in Figure 3 the recesses 41 are tapered to converge in corresponding directions circumferentially of the liner 27, and the dogs 42 are in the form of cylindrical rollers, as particularly shown in Figure 5, and of such diameter as to slidably contact the bottom walls of the enlarged portions of the recesses and the outer surface of the liner 27 so as to freely turn in the recesses when the shaft 19 is rotated in a direction towards the large ends of the recesses. The dogs 42 thus ride in such frictional contact with the outer periphery of the liner 27 that on reverse rotation of the shaft 19, the dogs will be rolled towards the reduced ends of the recesses 41 to effect wedge engagement with the brake ring 25 as before stated. In order to prevent chattering of the dogs 42 and to maintain them in slidable contact with the liner 27, spring pressed pins 43 are mounted in the brake ring 25 and arranged to bear against dogs 42.

In some instances the brake engaging element may be carried by the drive shaft, as illustrated for example in Figures 7, 8 and 9, in which the reference characters 19 indicate the propeller or drive shaft, 24 designates the sleeve keyed thereon, and 25 denotes the brake ring. In the construction shown in Figure 7, the sleeve 24 is formed with tapered recesses 44 in which are disposed single cylindrical dogs 45. In the construction shown in Figure 8, the sleeve 24 is formed with elongated tapered recesses 46 in each of which is disposed a plurality of cylindrical dogs 47. In the construction shown in Figure 9, the sleeve 24 is formed with a plurality of substantially V-shaped recesses 48 in each of which is mounted a dog 49 constituting an oscillatory block formed with an inclined end face adapted to effect wedge engagement between the sleeve 24 and ring 25 on reverse rotation of the shaft 19.

In the construction shown in Figure 10, an arrangement similar to that shown in Figure 3 is employed excepting that the recesses 41 in the ring 25 are elongated and a plurality of the dogs 42 is provided in each recess to effect engagement with the sleeve 24 or a liner thereon.

In the construction shown in Figure 11, the ring 25 is formed on its inner periphery with a series of substantially V-shaped recesses 50 in each of which is mounted an oscillatory dog 51 of the character shown in Figure 9 adapted on retrograde rotation of the shaft 19 to effect engagement with the sleeve 24.

Means are provided for throwing the detent 29 out of engagement with the brake ring 25 to release the latter relative to the fixed housing K and which means is adapted to be operated at will either by operation of the hand lever G on moving the latter to dispose the transmission gear mechanism in reverse or by the manipulation of an independent lever L. This means includes a slide bar 52 carried in the cover 18 of the transmission case 17 which is here shown as constituting the usual slide bar engaged by the gear shift lever G in actuating the slidable gear 20 in throwing the transmission gearing into reverse. As a means for adapting the slide bar 52 for the purpose of shifting the detent 29 a tubular sleeve 53 is connected to the slide bar 52 in telescopic engagement with the outer end thereof and is slidably supported in a bore 54 formed in the down-turned marginal flange 55 of the cover 18. The inner end of the sleeve 53 is formed with a flange 56 between which and the flange 55 bears a spring 57 which acts to normally maintain the sleeve 53 in a retracted position. Threaded in the outer end of the sleeve 53 for longitudinal adjustable movement therein is a pin 58 the outer end of which is arranged to bear against a lug 59 formed on the rear vertical edge of the detent 29, which latter is aligned with the slide bar 52 so that on advance movement of the latter the detent 29 will be rocked out of engagement with the brake ring 25.

The pin 58 is fitted with a lock nut 60 which constitutes a flange, and the lower end of the lever L has forked engagement therewith so that on rocking the lever L the sleeve 53 may be advanced independent of the slide bar 52 in opposition to the spring 57 to move the detent 29 out of engagement with the brake ring 25. The lever L is here shown as pivoted at 61 on a yoke 62 formed on the slotted lug 31.

As a means for retaining the sleeve 53 in its advanced position to hold the detent 29 out of engagement with the ring 25 a pawl 64 is provided which pawl is arranged and adapted to engage the flange 60 when the sleeve 53 is fully advanced; the pawl 64 being mounted on a rock shaft 65 journaled on the housing K and which rock shaft is fitted with a crank arm 66 and spring 67 to maintain the pawl 64 in its flange-engaging position.

Leading from the arm 66 is a cable 68 connecting with the clutch operating lever M in such manner that on depressing the lever M to release the vehicle clutch, not shown, the rock shaft 65 will be turned to move the pawl 64 out of engagement with the flange 60 to effect release of the sleeve 53 and allow the latter to be restored to normal under action of the spring 57 thereby permitting the detent 29 to be moved under the urge of the spring 33 to a position to effect reengagement with one of the recesses 28 on the brake ring 25.

The detent 29 is formed on its rear edge at the lower end thereof with a beveled face 70 as shown in Figure 15 which leads from the side of the detent toward which the ring 25 moves when being rotated with the shaft 19 on reverse movement of the latter, whereby in event the detent be released while the ring is rotating it will be prevented from entering a recess 28 by reason of the rear margins of the recesses striking the bevel and thereby throwing the detent outwardly until the movement of the ring is sufficiently slow to allow the detent to swing into a recess.

In the operation of the invention, the brake ring 25 is normally held against rotation by the detent 29 and the brake-engaging dogs are positioned to permit free rotation of the shaft 19 in a forward direction either through the medium of the motive power employed to propel the vehicle or through the rotation of the propeller shaft B from the drive wheels of the vehicle, as in coasting forwardly. In event that reverse rotative effort is imparted to the shaft B at any time, as from the traction wheels of the vehicle, while the brake ring 25 and the fixed housing K are connected together by the detent 29 reverse rotation of the propeller shaft B and of its associated shaft 19 and the traction vehicle wheels will be immediately prevented by reason of the brake-engaging dogs then moving to locking engagement with the brake ring 25 on slight retrograde movement of the shaft 19. The dogs thus act to hold the sleeve 24 and shaft 19 with its connected part against turning backward and thereby inhibiting reversed movement of the vehicle on its running gear. This action will occur whether the transmission gear mechanism is in neutral or in forward gear, thus serving to inhibit retrograde movement of the vehicle at all times except when the brake ring 25 is freed from its engagement with the housing K through the detent 29.

When it is desired to reverse the vehicle under its own power, the operating lever G is moved so as to place the transmission gear in reverse, which is effected in the usual manner by manipulating the lever G to shift the slide bar 52 and thereby effect movement of gear 20 to its reversing position as is common in transmission gear shift operations. This movement of the slide bar 52 operates as before described to shove the detent 29 out of engagement with the brake ring 25 whereupon the latter is free to rotate with the shaft 19 whereupon the latter may be driven in a reverse direction to effect reverse movement of the vehicle.

When it is desired to move the vehicle rearward on its wheels other than under its own power, as may become necessary when the vehicle is parked, the lever L is manipulated as before described to move the detent out of engagement with the brake ring. It will now be apparent that the levers L and G provide a two point manually operable means for shifting the sleeve 53 to effect disengagement of the detent from the brake ring.

On the sleeve 53 being moved to effect disengagement of the detent from the brake ring 25 by operation of either the lever G or the lever L, the detent will be held against reengaging with the brake ring 25 by the pawl 64 engaging the flange 60 on the sleeve 53, whereby the latter will be retained in its advanced position. It therefore becomes necessary to disengage the pawl 64 from the flange 60 in order to restore the reverse arresting brake to its operative condition, this is effected on depression of the clutch operating lever M, as before described, and inasmuch as the vehicle clutch is ordinarily thrown out of operation by depression of the lever M before manipulating the gear shift lever G in restoring it to neutral, or in moving it to any position after having placed the transmission mechanism in reverse, the restoration of the reverse arresting brake to its operative condition will thus be effected when the transmission mechanism is positioned out of reverse.

It follows that inadvertent maintaining of the reverse arresting brake out of operative condition during propulsion of the vehicle is obviated since each operation of the vehicle clutch control will retract the pawl 64 so that if at any time the latter is engaged with the flange 60 to hold the detent 29 out of engagement with the brake ring, it will be actuated to effect release of the detent.

I claim:

1. In a motor vehicle, a transmission mechanism, a shaft driven by said transmission, a clutch operating member, brake means operating upon initial reverse rotation of said shaft to prevent further reverse rotation thereof, means rendering said brake means inoperative when the transmission mechanism is manipulated to reverse the direction of rotation of said shaft, means restoring the brake means to operative condition when the clutch operating member is manipulated, and further means operable at will and independently of said transmission mechanism for rendering said brake means inoperative.

2. In a motor vehicle, a transmission mechanism, a shaft driven by said transmission, a clutch operating member, brake means operating upon initial reverse rotation of said shaft to prevent further reverse rotation thereof, means rendering said brake means inoperative when the transmission mechanism is manipulated to reverse the direction of rotation of said shaft, means for maintaining the brake means inoperative following an operation of the last named means, means restoring the brake means to operative condition when the clutch operating member is manipulated, and further means operable at will and independent of the transmission mechanism for rendering said brake means inoperative.

3. In a motor vehicle, a clutch operating member, means operating upon unintentional initial backward movement of the vehicle to arrest further backward motion, means operative at will to render the braking means inoperative, means maintaining the brake means inoperative following an operation of the last named means, means operating to restore the brake mechanism to operative condition when the clutch member is manipulated, and further means operable independent of the aforesaid means for rendering the brake means inoperative.

4. In a motor vehicle, a transmission mechanism, a drive shaft, means associated with said shaft for preventing unintentional rearward movement of the vehicle, said means including a brake member fixed for rotation with the shaft, a brake ring surrounding said member, means of operative connection between said ring and member operating to rotate the ring upon rotation of the shaft in one direction, a detent normally withdrawably engaged with and holding said ring against rotation, spring means normally holding said detent in such engagement with said ring, means operating to withdraw said detent and release said ring when the transmission mechanism is placed in reverse, means operating to releasably lock the detent in withdrawn position, and means operable to release said detent locking means.

5. In a motor vehicle, a transmission mechanism, a drive shaft, means associated with said shaft for preventing unintentional rearward movement of the vehicle, said means including a brake member fixed for rotation with the shaft, a brake ring surrounding said member, means of operative connection between said ring and member operating to rotate the ring upon rotation of the shaft in one direction, a detent normally withdrawably engaged with and holding said ring against rotation, spring means normally holding said detent in such engagement with said ring, means operating to withdraw said detent and release said ring when the transmission mechanism is placed in reverse, means operating to releasably lock the detent in withdrawn position, means operable to release said detent locking means, and means operable at will to withdraw said detent from locking engagement with said ring.

6. In a motor vehicle, a transmission mechanism, a drive shaft operated thereby, a brake member fixed on said shaft, a brake ring surrounding said member, a detent normally withdrawably engaged with and holding said ring against rotation, spring means urging said detent into ring holding position, means of connection between said ring and member operating to lock the ring and member against relative rotation incident to unintentional backward movement of the vehicle, means operating to withdraw said detent from ring holding position when the transmission mechanism is disposed in reverse, means automatically engaging and holding said detent when the latter is withdrawn from ring holding position, and means for releasing said detent holding means.

FRANK C. LAMB.